United State
Coleman

[11] 4,026,267
[5] May 31, 1977

[54] SOLAR ENERGY APPARATUS

[76] Inventor: Rich F. Coleman, 117 "P" St., Salt Lake City, Utah 84103

[22] Filed: Dec. 11, 1975

[21] Appl. No.: 639,664

[52] U.S. Cl. .............................. 126/270; 126/271; 350/96 B; 136/89 R

[51] Int. Cl.² ........................................... F24J 3/02

[58] Field of Search .......... 126/270, 271; 350/96 B; 136/89

[56] References Cited

UNITED STATES PATENTS

| | | | |
|---|---|---|---|
| 2,780,765 | 2/1957 | Chapin | 136/89 |
| 3,323,886 | 6/1967 | Hays | 350/96 B |
| 3,379,394 | 4/1968 | Bialy | 126/270 |
| 3,444,946 | 5/1969 | Waterbury | 180/65 |
| 3,780,722 | 12/1973 | Swet | 126/270 |
| 3,905,352 | 9/1975 | Jahn | 126/270 |
| 3,929,121 | 12/1975 | Rogers | 126/271 |
| 3,936,157 | 2/1976 | Kapany | 350/96 B |
| 3,949,732 | 4/1976 | Reines | 126/270 |

Primary Examiner—William R. Cline
Assistant Examiner—H. Jay Spiegel
Attorney, Agent, or Firm—H. Ross Workman; J. Winslow Young

[57] ABSTRACT

A solar energy apparatus for gathering and transmitting solar radiation to an energy storage area. Wide-angle lens apparatus is used to focus solar radiation on an end of an optical fiber bundle. The other end of the optical fiber bundle is placed in the energy storage area and has a radiating device attached thereto to more efficiently remove the solar energy from the optical fiber bundles. A heat sink is advantageously utilized as a storage means for the solar energy thus gathered and transmitted.

5 Claims, 2 Drawing Figures

SOLAR ENERGY APPARATUS

BACKGROUND

1. Field of the Invention

The present invention relates to solar energy collection, transmission, and storage apparatus.

2. The Prior Art

Recent difficulties encountered in the energy field, particularly those relating to the petroleum industry, has led to an increased interest and emphasis on the efficient capture, transmission, storage, and utilization of solar energy as an alternate energy source. A number of inventions have been developed and include, for example, U.S. Pat. Nos. 3,379,394; 3,780,722; and 3,905,352. Each of these inventions are either for a special purpose or are expensive to construct and/or operate thereby significantly reducing the wide application of their concept. What is needed is a solar energy device which is (1) relatively inexpensive to construct, (2) efficiently stores and utilizes a maximal quantity of incident solar radiation, and (3) provides means for alternate powering of the energy distribution portion of the apparatus. Such an invention is disclosed herein.

BRIEF SUMMARY AND OBJECTS OF THE INVENTION

In summary, the method and apparatus of the present invention employ wide-angle lens apparatus for focusing incident solar radiation on the ends of bundles of optical fibers. The optical fiber bundles transmit the solar radiation to a storage and/or utilization site. Absorption of some of the solar radiation by the optical fiber bundles along its length converts the solar radiation from the visible spectrum to the infrared or thermal region. The remainder of the solar energy is absorbed in the storage and/or utilization site primarily in either a heat sink or by a photoelectric cell system. The solar energy converted to heat is stored in a heat sink until utilized for ambient conditioning purposes.

The solar energy collection site can be remotely mounted, for example, on a roof or the like, while the optical fiber bundles are used to transmit the collected solar energy over a limited distance to the storage and/or utilization site.

It is therefore an object of this invention to provide improvements in solar energy utilization apparatus.

Another object of this invention is to provide improvements in the method of utilizing solar energy.

An even still further object of this invention is to provide apparatus wherein the solar energy can be collected remotely from and transmitted to the storage and/or utilization site.

An even still further object of this invention is to utilize a portion of the transmitted solar radiation for driving a conventional photoelectric cell/battery power supply.

These and other objects and features of the present invention will become more fully apparent from the following description and appended claims taken in conjunction with the accompanying drawing.

DETAILED DESCRIPTION OF THE PREFERRED EMBODIMENTS

The invention is best understood by reference to the figures wherein like parts are designated with like numerals throughout.

Figure 1:
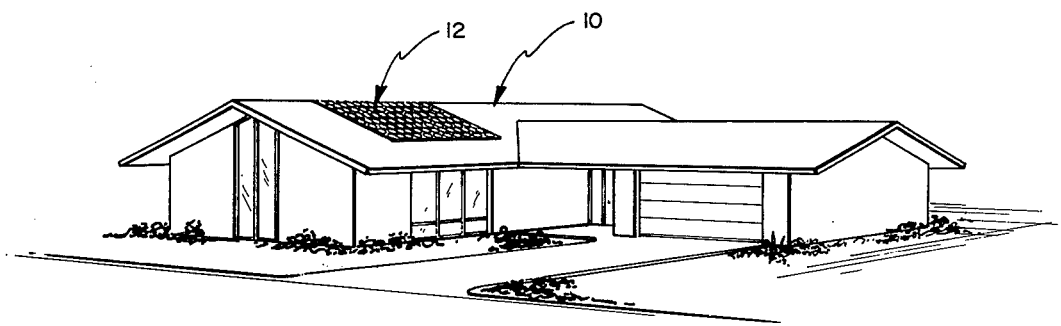
FIG. 1 is a schematic illustration of the solar energy collector portion of the present invention shown in the environment of a dwelling.

Referring particularly to FIG. 1, a dwelling is shown generally at 10 and, superimposed on the roof thereof, where it will receive a maximum incidence of solar radiation is a solar collector apparatus 12. The roof of dwelling 10 is the preferred location for solar collector apparatus 12 since it thereby does not occupy valuable yard space and, simultaneously, it is placed so as to minimize shading by trees and the like and is also afforded protection from damage. Clearly, solar collector apparatus 12 need not be placed directly on the roof of the dwelling 10 but may be suitably placed at other locations for exposure to solar radiation. The present invention is useful for purposes other than in conjunction with a dwelling and may advantageously be used in farm outbuildings, multiple dwelling structures and the like.

Figure 2:
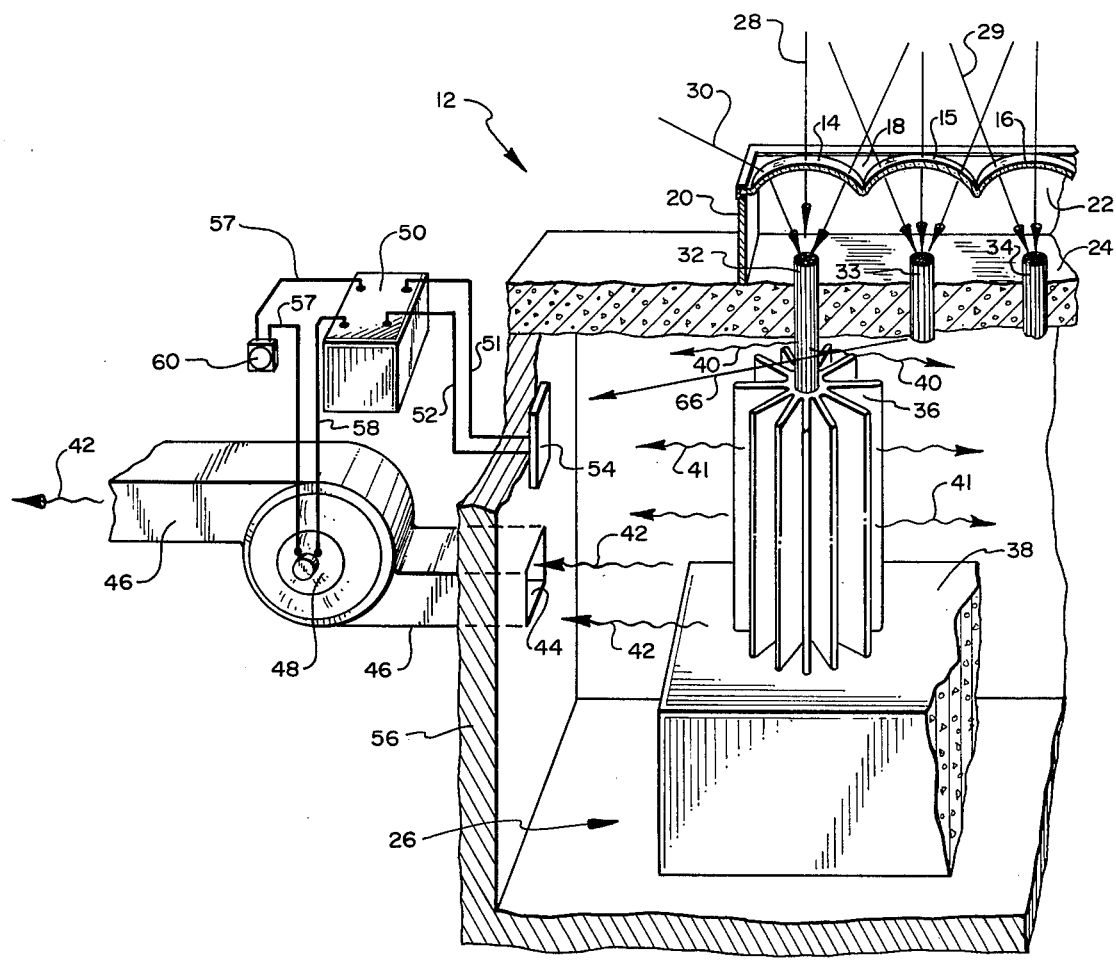
FIG. 2 is a schematic, fragmentary, perspective illustration of one presently preferred embodiment of the present invention.

Referring now more particularly to FIG. 2, the solar collector apparatus 12 includes a plurality of wide-angle lenses 14–16 and which are, preferentially, molded as a unitary structure to form an integral panel unit 18. Any suitable plastic material, for example, an acrylic plastic, may be advantageously used to mold the panel 18 and the wide-angle lenses 14–16 therein. Advantageously, panel 18 is molded as a unitary panel with a plurality of lenses 14–16 and others (not shown) arranged in a nested array. The nested array provides increased lenses per unit of space and also imparts structural rigidity to panel 18.

Panel 18 is supported above roof deck 24 by a framework 20 to place lenses 14–16 where they will be focused on the ends of optical fiber bundles 32–34, respectively. The combination of panel 18 and framework 20 provides a weatherproof enclosure 22 so as to minimize leakage around and damage to optical fiber bundles 32–34. In this manner, the portion of roof deck 24 surrounding optical fiber bundles 32–34 need not be tightly sealed against moisture since it is protected by enclosure 22.

Each of lenses 14–16 has a larger area than its respective optical fiber bundles 32–34. For example, it is presently estimated that an area ratio of 20:1 for each lens/optical fiber bundle is the optimum ratio for transmission of focused solar radiation. For example, it is currently estimated that 200 square feet of focusing lenses (lenses 14–16, etc.) would be adequately served by 10 square feet in cross section of optical fiber bundles (optical fiber bundles 32–34, etc.). Of course, each lens would have a corresponding cross section of optical fiber bundle suitably interposed at its optimal focal distance in accordance with the schematic illustration of FIG. 2.

Incident solar radiation striking lenses 14–16 and indicated schematically herein as radiation beams 28–30 is focused on the ends of optical fiber bundles 32–34 by lenses 14–16, respectively. To this end, optical fiber bundles are very useful since a very high percentage of a broad band of wavelengths in the electromagnetic spectrum, including the relatively narrow visible band of the spectrum, of the solar radiation striking the ends thereof is transmitted through the optical fiber bundle. For example, it is currently estimated that approximately 99% of the solar radiation striking the end of an optical fiber bundle at an angle of 60° between the vertical or the longitudinal axis of the optical fiber bundle will be received and transmitted by the optical fiber bundle. Accordingly, the focal length of lenses can be suitably adjusted to take advantage of this feature.

Advantageously, lenses 14–16 are fabricated as wideangle lenses so as to suitably focus a maximal quantity of incoming solar radiation on the ends of each of respective optical fiber bundles 32–34. This is illustrated schematically by radiation beam 30 which has a low angle of incidence and is focused on the end of optical fiber bundle 32. In this manner, less reliance need be placed upon a focusing mirror system, for example, such as shown in U.S. Pat. No. 3,905,352. Panel 18, lenses 14–16, and respective underlying ends of optical fiber bundles 32–34 are, preferentially, arrayed so as to obtain optimal exposure to the sun, particularly during the winter season. This can be easily achieved by placing the collector portion 12 of this apparatus on a south-facing roof of dwelling 10 (FIG. 1), situated in the northern hemisphere.

The solar radiation transmitted through optical fiber bundles 32–34 is partially absorbed along the optical fiber bundle and radiated outwardly in the form of thermal energy as indicated schematically at 41. For example, it is currently estimated that approximately 100% of the transmitted solar radiation will be absorbed and radiated as thermal energy over a length of about 25 feet for certain types of optical fiber bundles. The absorption of solar radiation and conversion of the same to thermal energy occurs as a linear function over this length of the optical fiber bundle. Accordingly, for a distance of about 25 feet essentially all of the received solar radiation will be absorbed and reradiated as thermal energy 41. For lengths less than 25 feet, the transmitted solar radiation not absorbed in the optical fiber bundle is transmitted directly into the heat storage room 26 where it is absorbed by the materials therein, including heat sink 38. To assist in this absorption, heat sink 38, fins 36, and the walls of room 26 are painted black or some other suitable absorption color.

Very little solar radiation is radiated from the sides of the optical fiber bundle by reason of the nature of the optical fiber waveguides. Each optical fiber waveguide is fabricated with a core having a given index of refraction. The core is surrounded with sheath having a lower index of refraction. The sheath, accordingly, serves to keep almost all of the solar radiation in the optical fiber waveguide with the exception, of course, of that portion converted to thermal energy 41. This is known technology and optical fiber waveguides of this type are commercially available.

The exposed ends of the optical fiber bundles may be selectively coated with a vacuum deposited metallic "cold mirror" which serves as a filter to transmit the intensified flux in the optical fiber bundle while simultaneously preventing reentry into the optical fiber bundle of the longer wavelength thermal energy.

Referring particularly to optical fiber bundle 32, optical fiber bundle 32 extends through the roof deck 24 into the heat storage and/or utilization room 26. Thermal energy is radiated from optical fiber bundle 32 as indicated schematically by heat arrows 40. Assistance in radiating the thermal energy or heat 40 is obtained by using radiator fins 36 which are attached about the periphery of the optical fiber bundle 32. The heat being radiated by fins 36 is indicated schematically as heat arrows 41. The lower end of both fins 36 and optical fiber bundle 32 is embedded, as shown, within a heat sink 38 which acts to absorb thermal energy. Heat sink 38 may be any suitable material including, for example, water, wax, concrete, lead, and the like.

Alternatively, the optical fiber bundle may be placed so as to transmit solar radiation directly into room 26 where it is absorbed and converted to thermal energy as set forth above. An example of this embodiment is shown by optical fiber bundle 33. Furthermore, to assist ix powering the photoelectric panel 54, optical fiber bundle 33 may be directed so as to transmit light 66 directly on photoelectric panel 54.

Heat sink 38 may be any suitable material which will suitably absorb and radiate heat to thereby serve as a thermal energy storage medium. The particular material used will be indicated by such factors as cost, weight, efficiency, and safety. Clearly different applications and locations of the solar energy apparatus of this invention will indicate a suitable material for heat sink 38.

Warm air 42 is obtained by radiator fins 36 which also advantageously serve to radiate thermal energy from heat sink 38 into the surrounding ambient (as also indicated by heat arrows 41) so as to warm the ambient air as indicated by warm air arrows 42. The warm air 42 is removed from the heat storage and/or utilization room 26 through an opening 44 which serves as the opening to a heating duct 46. A blower 48 is interposed in duct 46 for drawing the warm air 42 from the heat storage and/or utilization room 26 and forcing it to where it will be utilized in the dwelling 10 (FIG. 1).

The operation of blower 48 is controlled by a thermostat 60 which may be remotely placed at some suitable location in dwelling 10 (FIG. 1). Accordingly, when the ambient temperature drops below the lower temperature limit set on thermostat 60, thermostat 60 closes the appropriate circuitry causing blower 48 to be actuated and force warm air 42 through duct 46 throughout dwelling 10 (FIG. 1). Cool air drawn from dwelling 10 (FIG. 1) may be recirculated, as is conventional, through appropriate duct work (not shown) into heat storage and/or utilization room 26 where it is rewarmed to become warm air 42. Termination of the operation of blower 48 and the corresponding warming cycle is accomplished by thermostat 60 detecting its upper temperature limit and opening the circuit to blower 48.

Blower 48 is suitably coupled by conventional techniques to an electrical power source which may be a part of the conventional household circuit (not shown) and/or, selectively, a storage battery 50. Blower 48 is connected to battery 50 through leads 57 and 58. Lead 58 passes through a thermostat 60, the operation of which has been set forth hereinbefore. Accordingly, depending upon the temperature selected at thermostat 60, the circuit defined by leads 57 and 58 will be suitably closed and the blower motor 48 activated to distribute warm air 42 to the selected locations. The location of thermostat 60 may be placed any suitable location in the dwelling in order to achieve a desired temperature of the ambient at that particular location. Storage battery 50 is recharged by electrical energy developed in photoelectric cell panel 54 by being connected through leads 51 and 52 to photoelectric cell panel 54 which is located interiorly of heat storage and/or utilization room 26. Panel 54 is powered by sunlight 66 transmitted through one or more of the optical fiber bundles (indicated herein schematically as optical fiber bundle 33).

THE METHOD

The method of this invention includes installing a solar energy collector apparatus 12 on or adjacent a structure which is to advantageously utilize the heat captured thereby. Installation is made either while the structure is under construction or after it has been constructed. Solar energy collector apparatus 12 is placed so as to receive maximal exposure to incident solar radiation. During periods of daylight, incoming solar energy, solar radiation arrows 28-30, selectively impinge upon lenses 14-16 and are thereafter selectively focused on the respective fiber optic bundles 32-34. The incoming solar radiation is converted to the infrared or thermal spectrum by absorption either along the length of the optical fiber bundle or inside the heat storage and/or utilization room where it is stored until needed.

Thermal energy developed inside the optical fiber bundle is radiated either directly from the optical fiber bundle as heat arrows 40 or by the radiator fins 36 as indicated by heat arrows 41. Radiators 36 direct thermal energy into and out of heat sink 38 where it is stored and suitably reradiated to warm the warm air 42 for the purposes set forth hereinbefore. Cool air is introduced into heat storage and/or utilization room 26 from an inlet (not shown) which may communicate directly with outside or may be recirculated from the ambient within the dwelling 10 (FIG. 1). Alternatively, the heat sink 38 may be directly coupled to a conventional fluid circulating system (not shown) which acts as an absorber for the heat and transmits the same to a remote heater and the like. Preferably, the heat storage room 26 is insulated so as to minimize heat losses and thereby increase the efficiency of the apparatus and method of this invention.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A solar energy apparatus comprising:
    transmitting means and lens means for focusing solar energy on the transmitting means, said transmitting means comprising a plurality of optical fiber waveguides incorporated into a plurality of optical fiber bundles, at least a first optical fiber bundle accommodating absorption of solar energy as thermal energy, a radiating fins means attached to the first optical fiber bundle for radiating the thermal energy from the first optical fiber bundle, at least a second optical fiber bundle accommodating transmission of the solar energy; and
    utilization means comprising a heat sink means and means for circulating heat from the heat sink means, the heat sink means comprising a heat storage enclosure and a heat sink in the heat storage enclosure, the means for circulating heat from the heat sink means comprising a duct means communicating with the heat storage enclosure, an electric motor, a blower in the duct means, the blower driven by the electric motor, a storage battery for operating the electric motor, a switch means supplying electrical energy from the storage battery to the electric motor, and a photoelectric cell means inside the heat storage enclosure for recharging the storage battery from solar energy transmitted by the second optical fiber bundle.

2. A solar energy apparatus as defined in claim 1 wherein the lens means comprises a plurality of discrete lenses formed in lateral nested array in a panel, each lens having a predetermined focal point lying in essentially the same plane which is parallel to the plane of the panel.

3. A solar energy apparatus as defined in claim 2 wherein an end of each optical fiber waveguide bundle is interposed in proximity to a focal point of each of said lenses, respectively.

4. A solar energy apparatus comprising:
    a heat sink means comprising a heat storage room and a heat sink enclosed in spaced relationship within the heat storage room;
    a plurality of fiber optic bundles in thermal and optical contact with the heat sink means and comprising at least a first fiber optic bundle and a radiating fins means attached to the first fiber optic bundle, the first fiber optic bundle accommodating the absorption of solar energy as thermal energy, the radiating fins means being at least partially embedded in the heat sink with the remainder of the radiating fins exposed to the ambient in the heat storage room, the radiating fins means accommodating conduction of thermal energy from the fiber optic bundle into the heat sink and the heat storage room and between the heat sink and the heat storage room, at least a second fiber optic bundle characterized by the absence of radiating fins and terminating in optical communication with the heat storage room, the second fiber optic bundle accommodating the transmission of solar energy into the heat storage room; and
    a lens means for focusing solar energy on each of the respective ends of the optical fiber bundles.

5. A method for utilizing solar energy by directing the solar energy to an energy storage area and withdrawing the energy therefrom comprising the steps of:
    obtaining a plurality of optical fiber bundles, at least a first optical fiber bundle having a radiating fin means attached to the first optical fiber bundle, at least a second optical fiber bundle terminating inside a heat storage enclosure for transmitting solar energy into the heat storage enclosure;
    exposing one end of the optical fiber bundles to a lens means, the lens means focusing solar energy on the ends of the bundles, the optical fiber bundles transmitting the solar energy and absorbing a first portion of the same thereby converting the first portion of solar energy to thermal energy;
    converting a second portion of the transmitted solar energy into electricity by exposing a photoelectric cell means to the second portion of transmitted solar energy;
    providing thermal contact between the first optical fiber bundle and a heat sink means comprising the heat storage enclosure and a heat sink in the heat storage enclosure, the radiating fin means being at least partially embedded in the heat sink and exposed to the ambient in the heat storage enclosure thereby providing the thermal contact therebetween, the heat sink absorbing thermal energy and re-radiating the thermal energy into the heat storage enclosure; and utilizing the thermal energy in the heat sink means by circulating air through the heat storage enclosure thereby absorbing thermal energy from the heat sink means.

* * * * *